(12) United States Patent
Murosaki

(10) Patent No.: US 8,755,090 B2
(45) Date of Patent: Jun. 17, 2014

(54) IMAGE READING APPARATUS

(75) Inventor: Mikio Murosaki, Ishikawa (JP)

(73) Assignee: PFU Limited, Ishikawa (JP)

( * ) Notice: Subject to any disclaimer, the term of this patent is extended or adjusted under 35 U.S.C. 154(b) by 523 days.

(21) Appl. No.: 13/051,684

(22) Filed: Mar. 18, 2011

(65) Prior Publication Data

US 2011/0292459 A1 Dec. 1, 2011

(30) Foreign Application Priority Data

Jun. 1, 2010 (JP) ................................. 2010-126116

(51) Int. Cl.
*H04N 1/04* (2006.01)

(52) U.S. Cl.
USPC ............................ 358/474; 358/496; 358/498

(58) Field of Classification Search
USPC .......................... 358/474, 473, 497, 498, 488
See application file for complete search history.

(56) References Cited

U.S. PATENT DOCUMENTS

| | | | | |
|---|---|---|---|---|
| 5,901,276 | A * | 5/1999 | Murahashi et al. | 358/1.13 |
| 5,933,686 | A * | 8/1999 | Ootsuka et al. | 399/87 |
| 6,301,023 | B1 * | 10/2001 | Hirai et al. | 358/498 |
| 6,647,243 | B2 * | 11/2003 | Sato et al. | 399/407 |
| 8,286,083 | B2 * | 10/2012 | Barrus et al. | 715/745 |
| 8,322,711 | B2 * | 12/2012 | Hayama et al. | 271/162 |
| 8,331,000 | B2 * | 12/2012 | Fujiwara | 358/488 |
| 8,368,973 | B2 * | 2/2013 | Sato et al. | 358/486 |
| 2003/0222150 | A1 * | 12/2003 | Sato et al. | 235/472.02 |
| 2004/0070614 | A1 * | 4/2004 | Hoberock | 345/764 |
| 2006/0022400 | A1 * | 2/2006 | Kawasaki et al. | 271/227 |
| 2006/0072940 | A1 * | 4/2006 | Morita et al. | 399/227 |
| 2007/0081212 | A1 * | 4/2007 | Tonami et al. | 359/197 |
| 2007/0245362 | A1 * | 10/2007 | Suenaga | 720/658 |
| 2008/0151331 | A1 * | 6/2008 | Osakabe | 358/498 |
| 2008/0204828 | A1 * | 8/2008 | Akimoto et al. | 358/498 |
| 2008/0224391 | A1 * | 9/2008 | Oshima | 271/265.01 |
| 2008/0292175 | A1 * | 11/2008 | Lech et al. | 382/140 |
| 2008/0309644 | A1 * | 12/2008 | Arimoto | 345/173 |
| 2009/0057995 | A1 * | 3/2009 | Murakami et al. | 271/262 |
| 2009/0219580 | A1 * | 9/2009 | Cornell et al. | 358/474 |

(Continued)

FOREIGN PATENT DOCUMENTS

| | | | |
|---|---|---|---|
| CN | 101462422 A | 6/2009 | |
| JP | 05-063904 A | 3/1993 | |

(Continued)

OTHER PUBLICATIONS

Chinese Office Action issued in Chinese Application No. 201110129812.2 mailed Jun. 9, 2013.

(Continued)

*Primary Examiner* — Madelein A Nguyen

(74) *Attorney, Agent, or Firm* — McDermott Will & Emery LLP

(57) ABSTRACT

The image reading apparatus includes an operation unit operated by a user for detecting an instruction from the user, a transportation unit for transporting a read medium, a medium detector for detecting the read medium, a reader for reading the read medium, and an instruction detector for detecting the instruction from the user. The instruction detector is different from the operation unit. Moreover, the apparatus includes a controller for performing control, based on the instruction from the user. The instruction detector is valid between a time when the medium detector detects the read medium and a time when reading the read medium is finished.

6 Claims, 3 Drawing Sheets

(56) References Cited

U.S. PATENT DOCUMENTS

| | | |
|---|---|---|
| 2009/0268333 A1* | 10/2009 | Haga .............................. 360/69 |
| 2010/0014112 A1* | 1/2010 | Yoshida ....................... 358/1.15 |
| 2010/0300196 A1* | 12/2010 | Ise ................................. 73/159 |
| 2010/0309490 A1* | 12/2010 | Singer et al. .................. 358/1.5 |
| 2011/0222095 A1* | 9/2011 | Sheng .......................... 358/1.13 |
| 2012/0229546 A1* | 9/2012 | Okada et al. .................... 347/14 |

FOREIGN PATENT DOCUMENTS

| | | |
|---|---|---|
| JP | 09-172512 | 6/1997 |
| JP | 2005-062402 A | 3/2005 |
| JP | 2007-007980 A | 1/2007 |
| JP | 2008-080521 A | 4/2008 |
| JP | 2010-181662 A | 8/2010 |

OTHER PUBLICATIONS

Japanese Office Action issued in Japanese Application No. 2010-126116 dated Jan. 21, 2014.

* cited by examiner

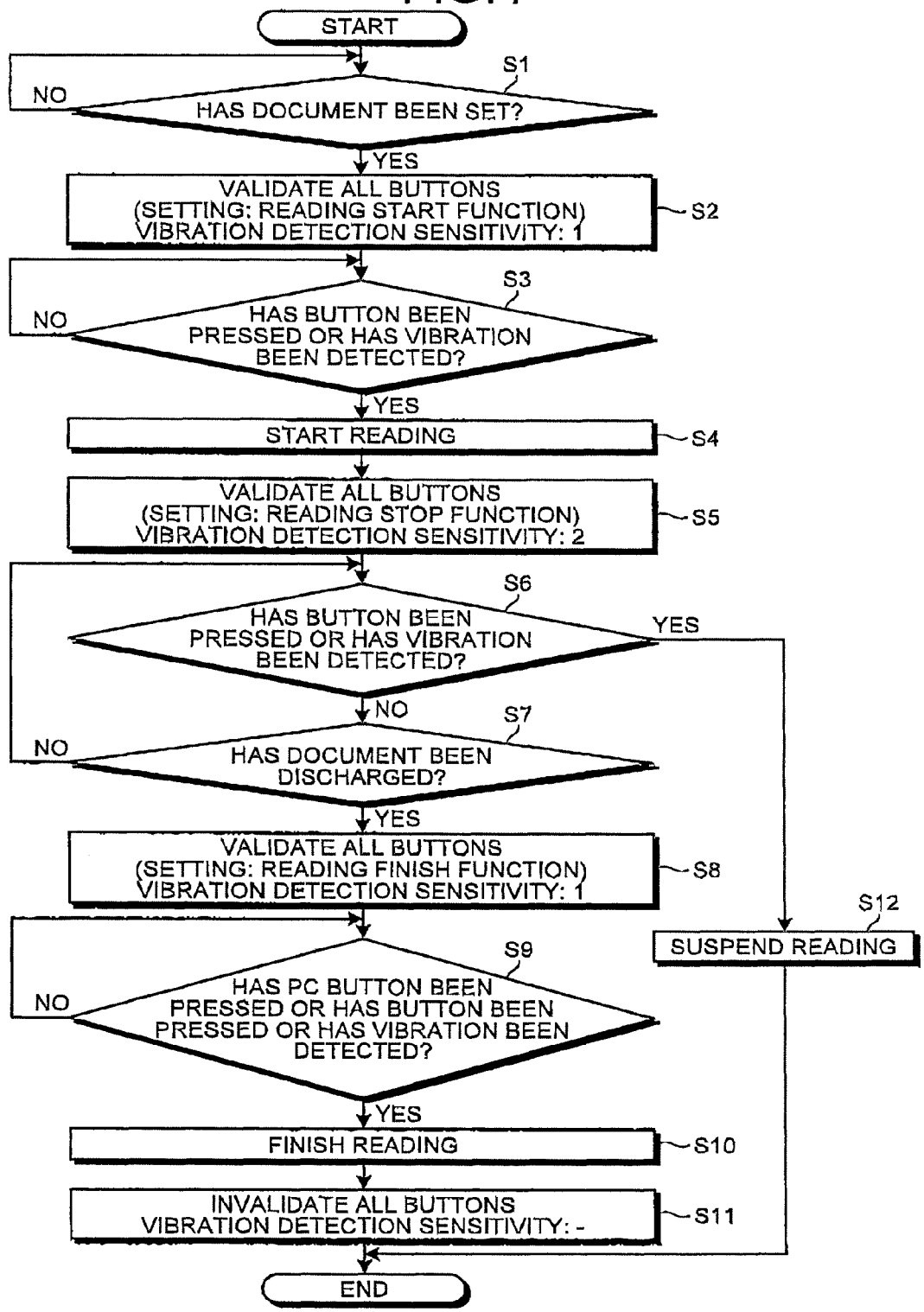

IMAGE READING APPARATUS

CROSS-REFERENCE TO RELATED APPLICATIONS

The present application claims priority to and incorporates by reference the entire contents of Japanese Patent Application No. 2010-126116 filed in Japan on Jun. 1, 2010.

BACKGROUND OF THE INVENTION

1. Field of the Invention

The present invention relates to an image reading apparatus.

2. Description of the Related Art

Conventionally, image reading apparatuses having operation units such as buttons have been known. Japanese Patent Application Laid-open No. 09-172512 discloses a technique concerning an image reading apparatus that includes an operation unit on the downstream side of the document transportation path in the document transporting direction (or on the paper discharging side). The operation unit includes a start key, a stop key, an image line density switch key, a telephone/facsimile switch key, and the like.

Further studies are to be made to improve the operability of image reading apparatuses. For example, in a case where buttons are formed as a means to give instructions in an image reading apparatus, a user needs to select the button corresponding to the contents of each instruction and operate within a predetermined region. The operability in performing operations to issue instructions to an image reading apparatus is expected to become higher.

There is a need to provide an image reading apparatus that can improve the operability in performing operations to issue instructions.

SUMMARY OF THE INVENTION

The invention is directed to an image reading apparatus that satisfies the need. The image reading apparatus includes an operation unit operated by a user for detecting a first instruction from the user; a transportation unit for transporting a read medium; a medium detector for detecting the read medium; a reader for reading the read medium; an instruction detector for detecting a second instruction from the user, the instruction detector being different from the operation unit; and a controller for performing control, based on the first instruction or the second instruction from the user, wherein the instruction detector is valid between a time when the medium detector detects the read medium and a time when reading the read medium is finished.

Moreover, the image reading apparatus includes a transportation unit for transporting a read medium; a medium detector for detecting the read medium; a reader for reading the read medium; an instruction detector for detecting the instruction from a user; and a controller for performing control, based on the instruction from the user, wherein the instruction detector is valid between a time when the medium detector detects the read medium and a time when reading the read medium is finished.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a flowchart showing operations of the image reading apparatus according to the embodiment.

DETAILED DESCRIPTION OF THE PREFERRED EMBODIMENTS

The following is a detailed description of an image reading apparatus according to an embodiment of the present invention, with reference to the accompanying drawings. It should be noted that the present invention is not limited by this embodiment. Also, elements of the embodiment described below include elements obvious to those skilled in the art or substantially the same elements.

[Embodiment]

Figure 1:
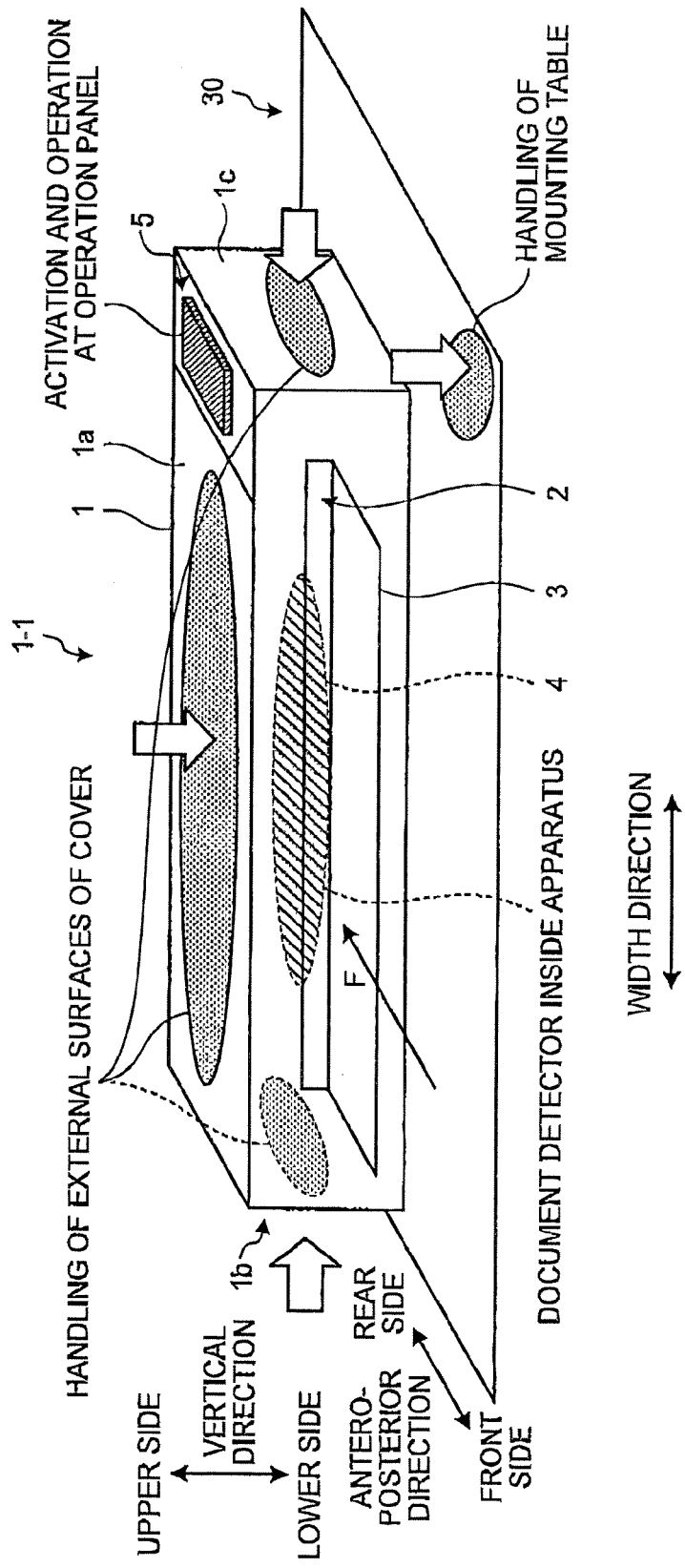
FIG. 1 is a perspective view showing an image reading apparatus according to an embodiment.
Figure 2:
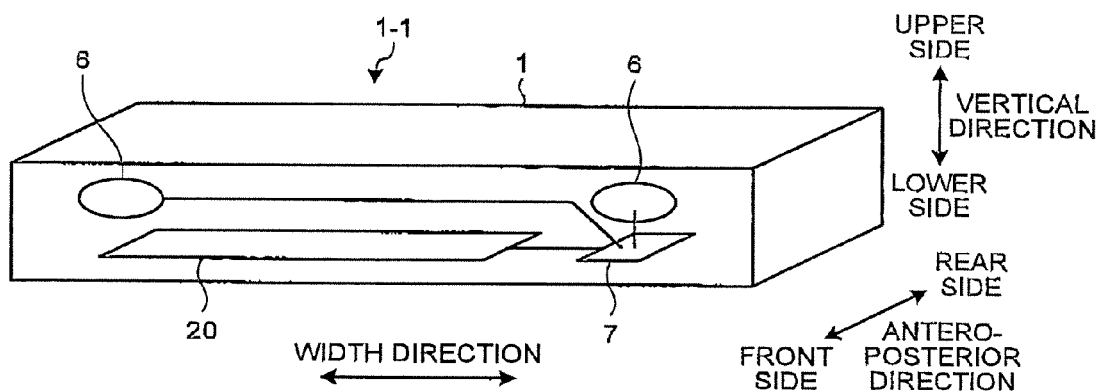
FIG. 2 is a diagram showing the inside of the image reader apparatus according to the embodiment.
Figure 3:
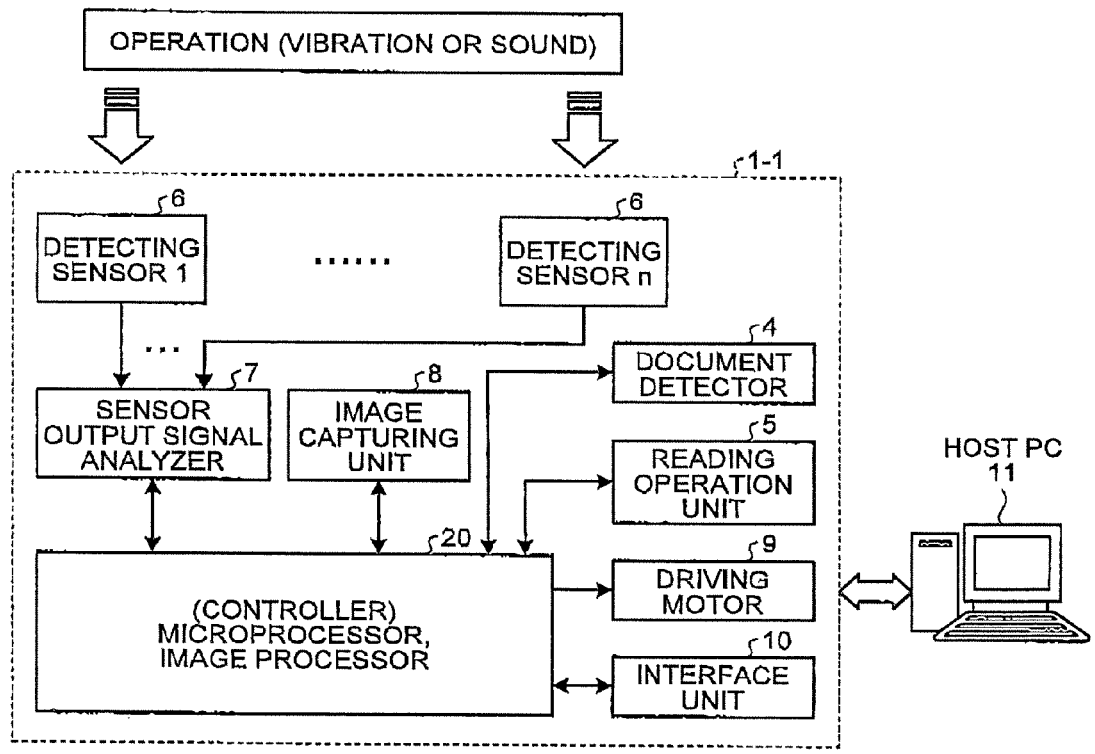
FIG. 3 is a block diagram of the image reading apparatus according to the embodiment.

Referring to FIGS. 1 to 4, an embodiment is described. This embodiment concerns an image reading apparatus. FIG. 1 is a perspective view showing an image reading apparatus according to the embodiment. FIG. 2 is a diagram showing the inside of the image reading apparatus according to the embodiment. FIG. 3 is a block diagram of the image reading apparatus according to the embodiment. FIG. 4 is a flowchart showing operations of the image reading apparatus according to the embodiment.

In the fields of image scanners and multifunction peripherals (MFP), devices that involve a button pressing method, Personal Computer (PC) keyboard inputs, operations of User Interface (UI) buttons on PC screens, and the like have been known as devices for issuing document-reading start, stop, and finish instructions. With those devices, it is necessary to perform operations within a certain narrow range, such as an operation to press a button or to handle a PC located at a certain location.

With an image reading apparatus 1-1 of this embodiment, a user can easily issue instructions to perform start, stop and finish reading operations, by handling an external surface of the apparatus other than an operation panel handling unit, for example, by providing vibrations. Also, a user can issue instructions about operations by vibrating a mounting table of the image reading apparatus 1-1. Further, inside the image reading apparatus 1-1, presence or absence of a document is sensed. The instruction contents that are valid when a user handles the external surfaces of the apparatus vary with the document transportation states as described below.

(1) Where a document has been inserted to the apparatus but transportation has not been started, "to start reading" becomes valid as the instruction contents. An instruction to start reading is enabled only where a document has been inserted to the apparatus.

(2) Where a document is being transported, "to suspend reading" becomes valid as the instruction contents. While a document is being transported, the operational sensitivity to the external surfaces of the apparatus other than the operation panel is lowered.

(3) Where a document has been discharged but any other finishing operations have not been performed, "to finish reading" becomes valid as the instruction contents. When the apparatus is already in a stand-by state, operations of the external surfaces other than the operation panel is disenabled.

With the image reading apparatus 1-1 of this embodiment, it is possible to issue instructions about operations by handling the external surfaces of the apparatus, and the operability becomes higher than the operability achieved by a button pressing method that requires an operation restricted within a predetermined range. The instruction contents that are valid when the external surfaces of the apparatus are handled vary with the document transportation states. With this arrangement, instructions according to the document transportation states can be given to the image reading apparatus 1-1, while the user is not required to perform complicated operations, such as changing the tapping manners or tapping spots depending on the contents of the instruction to be issued.

Vibration detecting sensors 6 as instruction detectors that detect a user instruction based on vibrations, are valid between the time when a document detector 4 detects a read medium and the time when the document detector 4 finishes reading the read medium. Here, "to finish reading" means that the user issues an instruction to finish reading when the reading of the last read medium to be read is completed. That is, when there is more than one read medium to be read successively by the image reading apparatus 1-1 of this embodiment, the user can issue instructions by vibrating the apparatus between the time when the first read medium is inserted to the apparatus and the time when a read finish instruction is issued as the reading of the last read medium is completed. After the reading is finished, the vibration detecting sensors 6 are made invalid, so as to prevent the image reading apparatus 1-1 from operating owing to false detection.

As shown in FIG. 1, the image reading apparatus 1-1 captures an image of a sheet-like read medium inserted as a document to be read and generates image data. In the following description, each reading medium will also be referred to as a "medium" or "document". The image reading apparatus 1-1 is applied to image scanners, copying machines, facsimile machines, and character recognition systems, for example. FIG. 1 shows a situation where the image reading apparatus 1-1 is placed on a mounting table 30 such as a desk. A medium is manually supplied into the image reading apparatus 1-1 of this embodiment by a user. However, the present invention is not limited to this, and the image reading apparatus 1-1 may include an Automatic Document Feeder (ADF) that automatically transports document as objects to be read. A sheet inlet 2 is formed in the front face of a cover 1 of the image reading apparatus 1-1. A hopper 3 on which media to be supplied are placed is attached to the sheet inlet 2. The hopper 3 protrudes forward from the sheet inlet 2 of the image reading apparatus 1-1. The upper surface of the hopper 3 functions as a guide for media to be inserted into the sheet inlet 2.

Each medium inserted into the sheet inlet 2 is transported in a transporting direction F through the transportation path inside the image reading apparatus 1-1 by transportation rollers (not shown). The transportation rollers are a transporting unit that transports media. The transportation rollers interpose a medium between a driving roller and a following roller and rotate to transport the medium. The read medium is discharged from a back face side of the image reading apparatus 1-1, for example.

In the following description, the vertical direction, the anteroposterior direction, and the width direction indicate the vertical direction, the anteroposterior direction, and the width direction in a situation where the image reading apparatus 1-1 is placed on the mounting table 30. The width direction of the image reading apparatus 1-1 matches the width direction of the medium to be transported.

The document detector 4 as a medium detector that detects a medium inserted into the sheet inlet 2 is set in the cover 1. The document detector 4 may be a known mechanical sensor, or a noncontact-type sensor such as a photosensor or an ultrasonic sensor. Detecting a medium, the document detector 4 outputs a signal indicating that a medium has been detected.

A reading operation unit 5 as an operation panel is placed on the upper face of the cover 1. The reading operation unit 5 is located on one end of the upper face of the cover 1 in its width direction. User instructions such as an instruction to activate the image reading apparatus 1-1, an instruction to start reading media, an instruction to suspend the reading of media, and an instruction to end the reading of media, are to be input to the reading operation unit 5. The reading operation unit 5 of this embodiment has buttons as operating parts. As a user handles the buttons, the reading operation unit 5 functions as an operation unit to detect user instructions. It should be noted that the operating parts formed in the reading operation unit 5 are not limited to buttons.

With the image reading apparatus 1-1 of this embodiment, the user can issue instructions about operations not only by handling the buttons of the reading operation unit 5, but also by handling the external surfaces of the cover 1. As will be described below with reference to FIG. 2, user instructions are detected based on vibrations caused by a user handling the external surfaces of the cover 1.

As shown in FIG. 2, the vibration detecting sensors 6 for detecting vibrations, a sensor output signal analyzer 7, and a controller 20 are placed in the image reading apparatus 1-1. The vibration detecting sensors 6 may be acceleration sensors that detect acceleration, for example. The vibration detecting sensors 6 function as instruction detectors that detect user instructions and are different detectors from the reading operation unit 5. The vibration detecting sensors 6 detect vibrations caused to the cover 1 by the user. The vibration detecting sensors 6 may detect vibrations themselves of the cover 1, or may detect vibrations of devices and components to which vibrations of the cover 1 are transmitted in the image reading apparatus 1-1.

A plurality of vibration detecting sensors 6 are placed in the cover 1. In this embodiment, one vibration detecting sensor 6 is placed at one end in the width direction, and another vibration detecting sensor 6 is placed at the other end. With this arrangement, the user can handle any spot in a wide region of the cover 1, such as issuing an instruction about an operation by tapping a desired spot. For example, as shown in FIG. 1, the user can issue an instruction to the image reading apparatus 1-1 by handling an upper face 1a of the cover 1, one side face 1b of the cover 1, or the other side face 1c of the cover 1. The upper face 1a of the cover 1 is easy for the user to handle. Therefore, the vibration detecting sensors 6 may be arranged so as to accurately detect vibrations caused when the upper face 1a is tapped. For example, the vibration detecting sensors 6 may be placed in the vicinities of the upper face 1a in the image reading apparatus 1-1. The present invention is not limited to the above arrangement, and the user can issue an instruction to the image reading apparatus 1-1 by tapping some part of the image reading apparatus 1-1 other than the cover 1. For example, in a case where the image reading apparatus 1-1 is designed so as to be held by a user by hand, the vibration detecting sensors 6 should preferably be able to detect vibrations caused by operations performed on the lower face of the cover 1. In an example case, the vibration detecting sensors 6 may be placed in the vicinities of the lower face inside the image reading apparatus 1-1.

The user can further issue an instruction to the image reading apparatus 1-1 by vibrating the mounting table 30. When the mounting table 30 vibrates as the user taps the mounting table 30 or the like, the vibration detecting sensors 6 can detect vibrations transmitted from the mounting table 30 to the cover 1. So as to detect vibrations of the mounting table 30, the vibration detecting sensors 6 may be placed at location close to the mounting table 30, for example. The user can vibrate the image reading apparatus 1-1 in such a manner as to be detected by the vibration detecting sensors 6, and issues instructions about operations, by tapping the mounting table 30 or tapping a spot on the mounting table 30 close to the image reading apparatus 1-1. Although two vibration detecting sensors 6 are used in this embodiment, the present invention is not limited to that, and three or more vibration detecting sensors 6 may be placed in the image reading apparatus 1-1. Alternatively, vibrations may be detected by a single vibration detecting sensor 6.

The sensor output signal analyzer 7 analyzes output signals of the vibration detecting sensors 6. Each of the vibration detecting sensors 6 is connected to the sensor output signal analyzer 7, and outputs a signal indicating the magnitude of detected vibrations or the magnitude of acceleration to the sensor output signal analyzer 7. The vibration detecting sensors 6 of this embodiment output electrical signals each having a size corresponding to the magnitude of acceleration. The sensor output signal analyzer 7 analyzes output signals of the vibration detecting sensors 6, and detects the peak value of vibrations, the number of vibrations, and the duration time of the vibrations. The sensor output signal analyzer 7 outputs the information about the analysis results to the controller 20. For example, the sensor output signal analyzer 7 may output the detection results of the vibration detecting sensor 6 having the highest detection intensity among the vibration detecting sensors 6 to the controller 20, or may output the total value or average value of the values detected by the vibration detecting sensors 6 to the controller 20.

The controller 20 determines whether an instruction has been issued by the user, based on the information obtained from the sensor output signal analyzer 7. The controller 20 functions as a determining unit that detects user instructions. Specifically, when the detection intensity of the vibration detecting sensors 6, the number of times detection has been performed, and the detection time satisfy predetermined conditions for detecting an instruction, the controller 20 determines that a user instruction has been detected. Here, the detection intensity is equivalent to the strength of the user tapping the cover 1 or to the amount of vibration detection. The number of times detection has been performed is equivalent to the number of times the user has tapped the cover 1 or the number of times a vibration has been detected. The detection time is equivalent to the time during which the user taps the cover 1.

For example, when an output signal having a detection intensity equal to or higher than a predetermined intensity is sent from the vibration detecting sensors 6, the controller 20 determines that a user instruction has been detected. Alternatively, when an output signal indicating a predetermined number of vibrations or more is output from the vibration detecting sensors 6 within a predetermined period of time, or when output signals at a certain level or higher are successively sent from the vibration detecting sensors 6 a predetermined period of time or more, the controller 20 may determine that a user instruction has been detected. However, the present invention is not limited to that, and the controller 20 may detect a user instruction, based on a combination of the detection intensity, the number of times detection has been performed, and the detection time. The controller 20 may also detect a user instruction, based on a value of an output signal of the vibration detecting sensors 6 other than the detection intensity, the number of times detection has been performed, and the detection time.

The controller 20 performs control, based on user instructions. Specifically, the controller 20 performs control, based on a user instruction detected by the reading operation unit 5, a user instruction detected from the information obtained from the sensor output signal analyzer 7, and a user instruction issued in a later described host PC 11. Referring now to FIG. 3, the image reading apparatus 1-1 is described below in detail.

As shown in FIG. 3, the image reading apparatus 1-1 includes an image capturing unit 8, a driving motor 9, and an interface unit 10, as well as the components described with reference to FIG. 1 and FIG. 2. The image capturing unit 8 is a reading unit that captures an image of a medium being transported through a transportation path by transportation rollers (not shown) and reads the medium. For example, the image capturing unit 8 may be a Charge Coupled Device (CCD). The driving motor 9 is a motor that rotates and drives the driving roller. The interface unit 10 is a communication interface between the controller 20 and the host PC 11.

The controller 20 includes a microprocessor, an image processor, and the like. The controller 20 controls the image reading apparatus 1-1 in a comprehensive manner. The controller 20 is connected to the document detector 4, the reading operation unit 5, the sensor output signal analyzer 7, the image capturing unit 8, the driving motor 9, and the interface unit 10 in order to exchange signals with those components.

The host PC 11 exchanges data with the controller 20 via the interface unit 10. Read image data is output from the controller 20 to the host PC 11. The host PC 11 can perform operations on and make settings for the image reading apparatus 1-1. Specifically, the host PC 11 can output operational instructions, such as an instruction to start reading a medium, an instruction to suspend the reading, and an instruction to finish the reading to the controller 20. The host PC 11 can set parameters related to the control on the image reading apparatus 1-1. For example, the host PC 11 can set the conditions for the controller 20 to detect an instruction, or can set the sensitivity of the vibration detecting sensors 6 to detect a user instruction. A graphical user interface (GUI) of an application concerning operations and settings of the image reading apparatus 1-1 is displayed on the monitor screen of the host PC 11. Buttons for operations and settings are arranged on this application. When a button is pressed with a pointing device such as a mouse, an instruction about the operation or setting corresponding to the pressed button is output to the image reading apparatus 1-1. With the host PC 11, operations can be performed on and settings can be made for the image reading apparatus 1-1 through keyboard operations.

In the image reading apparatus 1-1, the contents of instructions a user can issue by handling the external surfaces of the cover 1 via the vibration detecting sensors 6 vary with document transportation states. With this arrangement, the user has only to tap the cover 1 to provide the image reading apparatus 1-1 with instructions having the contents corresponding to the current document transportation states. Specifically, in a situation where a document has been set, and the preparation for transportation has just been completed, the user can issue an instruction to start reading the medium. With this arrangement, the user has only to tap an easy-to-handle part such as the upper face 1*a* or the side face 1*b* or 1*c* of the cover 1 after the document is inserted through the sheet inlet 2. In this manner, the user can make the image reading apparatus 1-1 start reading.

While the document is being transported, an instruction to suspend the reading of the document can be issued by handling the cover 1. When reading is to be suspended, the user has only to tap an easy-to-handle part of the cover 1, to immediately suspend the reading of the document. Accordingly, when document feeding is to be suspended, or when a skew or jam of a document occurs, for example, the document feeding can be instantly suspended. The user can check the document being transported while he/she is in such a state as to be able to immediately issue an instruction to suspend the reading, or while he/she is touching the cover 1 with his/her hand.

When the transportation of the document has been finished, an instruction to finish the reading of the document can be issued by handling the cover 1. When a read and discharged document is to be collected, the user simply has to tap the cover 1 to issue an instruction to finish the reading.

The vibration detection sensitivity or the detection sensitivity of the vibration detecting sensor 6 as an instruction detector can be set at various values in accordance with document transportation states. Accordingly, vibrations that are not generated by the user on purpose can be eliminated. The vibration detecting sensors 6 not only detect vibrations generated by the user handling the cover 1, but also detect vibrations caused by the driving of the image reading apparatus 1-1, vibrations caused by key punching of the host PC, or vibrations caused while a printer is in operation. In this embodiment, the vibration detection sensitivity of the vibration detecting sensors 6 while a document is being transported is made lower than the vibration detection sensitivity prior to the start of the reading or after the completion of the reading. With this arrangement, vibrations caused by the driving of the image reading apparatus 1-1, for example, vibrations caused by the driving of the driving motor 9 can be prevented from being mistakenly detected as vibrations generated by a user operation.

The vibration detection sensitivity can be changed by a user operation. The user can set the vibration detection sensitivity by handling the host PC 11 via the interface unit 10 or by handling the reading operation unit 5. The user can set threshold values that determine that a user instruction has been issued, with respect to the detection intensity of the vibration detecting sensors 6, the number of times detection has been performed, and the detection time. In this embodiment, it is possible to set vibration detection sensitivities that vary with the respective states: a state where the preparation for document transportation has been completed, a state where a document is being transported, and a state where transportation has been finished.

Here, the state where the preparation for transportation has been completed is a state where a document has been detected by the document detector 4 and transportation by transportation rollers driven by the driving motor 9 is ready to start. When a document is inserted to the image reading apparatus 1-1 of this embodiment by a user, the transportation rollers are rotated by a small amount to catch an end of the document, which is called a pre-pulling-in-operation. The pre-pulling-in operation is performed before an instruction to start reading is issued. Through the pre-pulling-in operation, the document is interposed between the driving roller and the following roller of the transportation rollers, and instantly becomes ready for a start of transportation when a user instruction to start reading is issued. In this embodiment, a state where a pre-pulling-in operation has been performed is called a state where the preparation for transportation has been completed. However, the present invention is not limited to that, and the state where the preparation for transportation has been completed may include the period of time between the detection of the document by the document detector 4 and the completion of the pre-pulling-in operation. Alternatively, the state where the preparation for transportation has been completed may be a state where a document has been detected by the document detector 4 and the transportation rollers are ready to pull in the document any time.

The state where a document is being transported is a state where a document is being transported by the transportation rollers. The state where transportation has been finished is a state where transportation of a document by the transportation rollers has been finished. The state where transportation has been finished, for example, may be a state where a document has been discharged from the transportation path. Based on the timing of completion of document reading, the state where a document is being transported and the state where transportation has been finished may be defined. For example, the state where a document is being transported may be the state appearing between the start of transportation of the document by the transportation rollers and the time when the document passes through the image capturing unit 8, and the state where transportation has been finished may be the state appearing after the document has passed through the image capturing unit 8. In such a case, even while the transportation rollers are transporting the document, the user can issue an instruction to finish reading, as long as the document has already passed through the image capturing unit 8. If an instruction to end reading is issued before the document is discharged, an operation to finish the reading is automatically performed after the document is discharged.

In this embodiment, detection sensitivities are set for the vibration detecting sensors 6 so that the detection sensitivity to be used when the state of the read medium is the state where the document is being transported is lower than both the detection sensitivity to be used in the state where the preparation for transportation has been completed and the detection sensitivity to be used in the state where transportation has been finished. However, the present invention is not limited to the above arrangement, and the detection sensitivity may be made lower than at least one of the detection sensitivity to be used in the state where the preparation for transportation has been completed and the detection sensitivity to be used in the state where transportation has been finished.

When vibration detection sensitivities are set, the user is preferably able to actually handle the external surfaces of the cover 1 to adjust the detection level while checking the results of detection performed by the vibration detecting sensors 6. In this manner, the user can check beforehand what amount of strength should be used to handle the cover 1 so that the operation is detected as an instruction.

Vibration detection sensitivities can be changed depending on the ambient environment. The controller 20 regularly measures rough noise based on the output signals from the vibration detecting sensors 6 when the power supply is switched on or the apparatus is in an idle state. In this manner, vibration detection sensitivities can be automatically changed. For example, in a case where vibration detection sensitivities have not been set by the user, operations by the user can be detected with the optimum sensitivity in accordance with the noise. In a case where vibration detection sensitivities have been set by the user, a notification that the set sensitivities are not suitable can be sent to prompt the user to change the settings. As a result, the influence of the noise of vibrations due to the installation environment of the image reading apparatus 1-1 and the ambient environment of peripherals and the like is reduced, and user instructions can be detected with high precision.

In a case where a sensor that detects user instructions based on sound is used as the instruction detector, detection sensitivities maybe be varied with transportation states. This is because the loudness of the sound generated from the image reading apparatus 1-1 varies with transportation states. For example, like the detection sensitivities set for the vibration detecting sensors 6, the detection sensitivity to be used in the state where a document is being transported may be made lower than at least one of the detection sensitivity to be used in the state where the preparation for transportation has been completed and the detection sensitivity to be used in the state where transportation has been finished.

Referring now to FIG. 4, the control operation according to this embodiment is described. The control flow shown in FIG. 4 is to be executed when the image reading apparatus 1-1 is in an idle state, and is to be repeated at predetermined intervals.

First, in step S1, the controller 20 determines whether a document has been set. If the controller 20 determines that a medium S inserted into the sheet inlet 2 has been detected based on the result of detection performed by the document detector 4, the controller 20 makes an affirmative judgment in step S1. If the controller 20 determines that a document has been set (step S1-Y) as a result of the determination, the operation moves on to step S2. If the controller 20 determines that a document has not been set (step S1-N), the determining procedure of step S1 is repeated.

In step S2, the controller 20 validates all the buttons. The controller 20 validates a reading start button of the reading operation unit 5 and a reading start button of an application of the host PC 11. The controller 20 also validates user instruction detection to be performed by the vibration detecting sensors 6, as the means to detect user instructions instead of operation buttons. In addition to that, a reading start instruction through a keyboard operation on the host PC 11 may be validated. In a state where a document has been set and the preparation for transportation of the document by the transportation rollers has been completed, the contents of an instruction the user can issue by handling the external surfaces of the cover 1 are set as the reading start function. That is, when a vibration satisfying the conditions for detecting an instruction is detected by the vibration detecting sensors 6, an instruction to start reading is considered to have been issued by the user. Also, the vibration detection sensitivity under the conditions for detecting an instruction is set. In the transportation prepared state where a document has been set, the vibration detection sensitivity is set at "1", which represents a high sensitivity.

In step S3, the controller 20 determines whether a button has been pressed or a vibration has been detected. If the reading start button of the reading operation unit 5 or the reading start button of the host PC 12 is pressed, or if a user instruction is detected based on the information from the sensor output signal analyzer 7, the controller 20 makes an affirmative judgment in step S3. If the controller 20 determines that a button has been pressed or a vibration has been detected, as a result of the determination (step S3-Y), the operation moves on to step 54. If the controller 20 determines that a button has not been pressed, and a vibration has not been detected (step S3-N), the determining procedure of step S3 is repeated.

In step S4, the controller 20 starts reading. The controller 20 transports the set document in the transporting direction by rotating the transportation rollers with the driving motor 9. The image capturing unit 8 captures an image of the document and generates image data. The image data generated by the image capturing unit 8 is output to the controller 20. The controller 20 uses the image processor to perform image processing on the image data obtained from the image capturing unit 8, and outputs the processed image data to the host PC 11.

In step S5, the controller 20 validates all the buttons. The controller 20 validates the reading stop button of the reading operation unit 5 and the reading stop button of an application of the host PC 11. The controller 20 also sets the contents of a user instruction to be detected by the vibration detecting sensors 6 as the reading stop function. That is, in the state where a medium is being transported, the contents of an instruction the user can issue by handling the external surfaces of the cover 1 are set as the reading stop function. In the instruction detecting conditions, the vibration detection sensitivity is set at "2", which is lower than the sensitivity "1" in the transportation prepared state. With this arrangement, vibrations generated from the image reading apparatus 1-1 itself can be prevented from being mistakenly detected as vibrations generated by a user operation.

In step S6, the controller 20 determines whether a button has been pressed or a vibration has been detected. If the reading stop button of the reading operation unit 5 or the host PC 11 is pressed, or if a user instruction is detected based on the information from the sensor output signal analyzer 7, the controller 20 makes an affirmative judgment in step S6. If the controller 20 determines that a button has been pressed or a vibration has been detected as a result of the determination (step S6-Y), the operation moves on to step S12. If the controller 20 determines that a button has not been pressed, and a vibration has not been detected (step S6-N), the operation moves on to step S7.

In step S7, the controller 20 determines whether the document has been discharged. The controller 20 determines whether the document has been discharged, based on the timing of completion of the image capturing unit 8 capturing an image of the document. For example, the controller 20 detects the timing of completion of capturing an image of the document or the timing of the document passing through the image capturing unit B by detecting the rear-end edge of the document by a known technique. The controller 20 may determine that the document has been discharged when the edge is detected, or may determine that the document has been discharged when a predetermined period of time has passed since the detection of the edge. Alternatively, a sensor may be placed on the downstream side of the image capturing unit 8 in the document transportation path in the transportation direction, and the sensor may detect the document being discharged from the image reading apparatus 1-1. If the controller 20 determines that the document has been discharged based on the result of the determining procedure of step S7 (step S7-Y), the operation moves on to step S8. If the controller 20 determines that the document has not been discharged (step S7-N), the operation moves on to the determining procedure of step S6.

In step S8, the controller 20 validates all the buttons. The controller 20 validates the reading finish button of the reading operation unit 5 and the reading finish button of an application of the host PC 11. The controller 20 also sets the contents of a user instruction to be detected by the vibration detecting sensors 6 as the reading finish function. That is, in the state where reading of a document has been completed and the document has been discharged, the contents of an instruction the user can issue by handling the external surfaces of the cover 1 are set as the reading finish function. In the instruction detecting conditions, the vibration detection sensitivity is set at "1".

In step S9, the controller 20 determines whether the finish button of the host PC 11 has been pressed, the finish button of the reading operation unit 5 has been pressed, or a vibration has been detected. If the reading finish button of the reading operation unit 5 or the host PC 11 is pressed, or if a user instruction is detected based on the information from the sensor output signal analyzer 7, the controller 20 makes an affirmative judgment in step S9. If the controller 20 determines that the finish button of the host PC 11 has been pressed, the finish button of the reading operation unit 5 has been pressed, or a vibration has been detected as a result of the determination (step S9-Y), the operation moves on to step 310. If the controller 20 determines that a button has not been pressed, and a vibration has not been detected (step S9-N), the determining procedure of step 39 is repeated.

In step S10, the controller 20 finishes the reading.

In step S11, the controller 20 invalidates all the buttons. The buttons related to reading are invalidated in the reading operation unit 5 and the host PC 11. The controller 20 also invalidates all detection signals of the vibration detecting sensors 6. The controller 20 also resets the vibration detection sensitivity. After step S11 is carried out, this control flow comes to an end, and the image reading apparatus 1-1 is put into an idle state.

When the operation moves on to step S12 after an affirmative judgment is made in step S6, the controller 20 suspends the reading in step S12. The controller 20 stops the image capturing by the image capturing unit 8, and stops the driving motor 9 to stop the document transportation. With this arrangement, the document can be pulled out when a paper jam occurs, for example. When the reading is suspended, the user may choose either to stop the document feeding or to let the document be automatically discharged by the transportation rollers. When step S12 is carried out, this control flow comes to an end, and the image reading apparatus 1-1 is put into an idle state.

As described above, in the image reading apparatus 1-1 of this embodiment, the user can issue instructions to the image reading apparatus 1-1 to start reading, suspend reading, and finish reading by handling the external surfaces of the cover 1. The image reading apparatus 1-1 includes not only the reading operation unit 5 detecting an instruction through a user operation such as pressing a button, but also a detector different from the reading operation unit 5, which is the instruction detector that detects vibrations to detect user instructions in this embodiment. Accordingly, higher operability can be achieved. The operation to issue an instruction in this embodiment is easier for users than an operation to press a button located at a certain spot on the reading operation unit 5 or an operation of the host PC 11. For example, a user who is not familiar with how to use a PC or a user who is not used to handling buttons can easily perform operations to issue instructions. Accordingly, the operability of the image reading apparatus 1-1 becomes higher.

In this embodiment, instructions to start reading, suspend reading, and finish reading can be issued by handling the cover 1. However, the present invention is not limited to that. For example, at least one of the instructions to start reading, suspend reading, and finish reading may be issued by handling the cover 1. For example, if instructions to suspend reading and finish reading can be issued by handling the cover 1, the operability becomes higher when document reading is to be immediately stopped. That is, users can issue an instruction to suspend reading by any convenient one of the following operations: an operation with the use of the reading operation unit 5, an operation with the use of the host PC 11, and an operation on the cover 1. Through an operation on the cover 1, an instruction to suspend reading can be immediately issued by tapping the cover 1. Alternatively, instructions different from any of the instructions to start reading, suspend reading, and finish reading may be issued by handling the cover 1.

[First Modification of Embodiment]

A first modification of the embodiment is now described. In the above described embodiment, the instruction detector that detects user operations is the vibration detecting sensors 6. However, the present invention is not limited to that.

The instruction detector may be a microphone that detects the sound of tapping on the cover 1. For example, a microphone is placed inside the image reading apparatus 1-1, and a user instruction can be detected based on the sound generated from the cover 1 when a user touches the cover 1. Since the frequency of the sound generated when the cover 1 is handled by tapping the cover 1 or the like is unique to the image reading apparatus 1-1, a user instruction is detected when the microphone detects sound at this frequency. In this manner, the detection accuracy can be improved.

The instruction detector may be a sensor such as a photosensor that detects blocking of the front side of an object to be detected. For example, a photosensor may be placed on an external surface such as the cover 1 of the apparatus. When the light path is blocked by a user putting his/her hand in the path, the photosensor can detect a user instruction. The instruction detector may be a sensor such as a capacitance sensor or a heat detecting sensor that detects the touch of a user. A sensor that detects the touch of a user is placed on an external surface of the cover 1 or the like of the apparatus, so that a user instruction can be detected when the user touches the sensor.

The image reading apparatus 1-1 may also include different kinds of sensors as the instruction detector. In that case, a detection sensitivity is preferably set for each kind of sensor. Also, the kinds of sensors may be associated with the contents of instructions a user can issue. For example, the respective instructions to start reading a document, suspend reading the document, and finish reading the document may be associated with different kinds of sensors from one another.

[Second Modification of Embodiment]

A second modification of the embodiment is now described. In the above described embodiment, the image reading apparatus 1-1 stands by until a finishing operation is performed in step S9 after the reading of a document is completed. Instead, the image reading apparatus 1-1 may automatically start reading when the next document is set.

Specifically, when reading of a document is completed, a check is made to determine whether a reading finishing operation has been performed in step S9, and another check is also made to determine whether a document has been set as in step S1. In a case where a reading finishing operation has been performed, the operation moves on to step S10. In a case where a document has been set, the operation moves on to step S4, and reading the document is started. That is, the image reading apparatus 1-1 does not stand by until an operation to start reading is performed by the user, but starts reading the set document.

As described above, in this modification, the image reading apparatus 1-1 starts reading the first medium detected by the medium detector only after receiving an instruction to start reading from the user, but spontaneously starts reading the second and later media detected by the medium detector. In this manner, the user can let the second and later documents be automatically read, without an operation being performed to issue an operation to start reading. Accordingly, documents can be successively read by the image reading apparatus 1-1, without a button operation being performed in between.

[Third Modification of Embodiment]

A third modification of the embodiment is now described. In the above described embodiment, the instruction detector is valid between detection of the first medium and the end of reading of read media. However, the period of time during which the instruction detector is valid is not limited to that. For example, the instruction detector may be valid between detection of each read medium and completion of the reading of the read medium. That is, every time reading of a read medium is completed, the instruction detector may be invalidated, and when a next read medium is detected, the instruction detector may be again validated.

A user may be allowed to switch the instruction detector between "valid" and "invalid". For example, a button for making the instruction detector valid or invalid may be attached to the image reading apparatus 1-1, or the instruction detector may be made valid or invalid through the host PC 11.

[Fourth Modification of Embodiment]

A fourth modification of the embodiment is now described. In the above described embodiment, a detection indicator indicating that an instruction is detected when the instruction detector detects a user instruction may be placed in the image reading apparatus 1-1. With this arrangement, a user can easily confirm that an instruction has been detected, and the operability becomes higher.

An image reading apparatus according to the present invention includes an operation unit operated by a user to detect an instruction from the user, and an instruction detector that is a detector different from the operation unit and detects the instruction from the user. The instruction detector is valid between the time when a read medium is detected by a medium detector and the time when the reading of the read medium is finished. As the image reading apparatus according to the present invention includes the instruction detector as well as the operation unit, the operability in performing operations to issue instructions can be advantageously improved.

What is claimed is:

1. An image reading apparatus comprising:
   an operation unit operated by a user for detecting a first instruction from the user;
   a transportation unit for transporting a read medium;
   a medium detector for detecting the read medium;
   a reader for reading an image of the read medium;
   an instruction detector for detecting a second instruction from the user, the instruction detector being different from the operation unit; and
   a controller for performing control, based on the first instruction or the second instruction from the user, wherein
   when the medium detector detects the read medium and the transportation unit is ready to transport the read medium, the instruction detector is configured to detect, as the second instruction from the user, an instruction to read the read medium,
   when the read medium is in transport, the instruction detector is configured to detect, as the second instruction from the user, an instruction to stop reading the read medium, and
   when the transporting of the read medium is completed, the instruction detector is configured to detect, as the second instruction from the user, an instruction to finish the reading of the read medium.

2. The image reading apparatus according to claim 1, further comprising at least one of sensors that include a sensor detecting the second instruction based on a vibration caused to a cover of the image reading apparatus by the user, a sensor detecting the second instruction based on sound generated from the cover when the user touches the cover, a sensor detecting the second instruction based on a vibration caused to a mounting table by the user, the image reading apparatus being placed on the mounting table, a sensor detecting the second instruction based on blocking a front side in a direction of an object to be detected by the user, and a sensor detecting the second instruction based on touching by the user.

3. The image reading apparatus according to claim 1, wherein the instruction detector detects instructions from the user, based on at least one of vibrations and sounds, and a detection sensitivity of the instruction detector varies with the transportation state of the read medium.

4. The image reading apparatus according to claim 3, wherein, when the transportation state of the read medium is a transported state, the detection sensitivity of the instruction detector is lower than at least one of a detection sensitivity to be set for the instruction detector when the transportation state is a transportation preparation completed state and a detection sensitivity to be set for the instruction detector when the transportation state is a transportation finished state.

5. The image reading apparatus according to claim 1, wherein the detection sensitivity of the instruction detector is variable based on at least one of an operation performed by the user and an ambient environment.

6. An image reading apparatus comprising:
   a transportation unit for transporting a read medium;
   a medium detector for detecting the read medium;
   a reader for reading the read medium;
   an instruction detector for detecting the instruction from a user; and
   a controller for performing control, based on the instruction from the user, wherein
   when the medium detector detects the read medium and the transportation unit is ready to transport the read medium, the instruction detector is configured to detect, as the second instruction from the user, an instruction to read the read medium,
   when the read medium is in transport, the instruction detector is configured to detect, as the second instruction from the user, an instruction to stop reading the read medium, and
   when the transporting of the read medium is completed, the instruction detector is configured to detect, as the second instruction from the user, an instruction to finish the reading of the read medium.

* * * * *